(12) United States Patent
Trela et al.

(10) Patent No.: US 7,335,385 B2
(45) Date of Patent: Feb. 26, 2008

(54) METHOD FOR IRON REMOVAL FROM WINE AND OTHER BEVERAGES

(75) Inventors: Brent Corey Trela, Davis, CA (US); Ernst Graf, Rathdrum, ID (US)

(73) Assignee: Brent C. Trela, St. Lubbock, TX (US)

( * ) Notice: Subject to any disclaimer, the term of this patent is extended or adjusted under 35 U.S.C. 154(b) by 574 days.

(21) Appl. No.: 10/905,840

(22) Filed: Jan. 22, 2005

(65) Prior Publication Data

US 2006/0165843 A1    Jul. 27, 2006

(51) Int. Cl.
*C12G 1/00* (2006.01)
(52) U.S. Cl. ............... 426/271; 426/531; 426/592; 426/330.4; 210/681
(58) Field of Classification Search ............... 210/688; 436/24; 426/271, 330.4, 571, 592
See application file for complete search history.

(56) References Cited

FOREIGN PATENT DOCUMENTS

FR     1533516    *   7/1968

* cited by examiner

*Primary Examiner*—D. Lawrence Tarazano
*Assistant Examiner*—Nikki H Dees

(57) ABSTRACT

Phytic acid is added to wine to chelate polyvalent iron cations. A calcium salt is added to co-precipitate the complex that subsequently is removed by filtration. This method effectively, inexpensively and safely removes excessive levels of iron in wine, sparkling wine, and other beverages without changing the pH, color or taste.

8 Claims, No Drawings

METHOD FOR IRON REMOVAL FROM WINE AND OTHER BEVERAGES

BACKGROUND OF THE INVENTION

Polyvalent cations of heavy metals such as iron when present in high concentration in wine and other beverages can adversely affect product quality. They may cause objectionable organoleptic properties including metallic taste, discoloration and oxidative flavor changes, as well as forming hazes and cloudiness. Reducing heavy metal content in beverages, especially wines, has long been desirable.

Iron can accumulate in beverages for a number of reasons, for example, from high iron content soils and dust that settle on the fruit before processing. The main reason iron may amass is from the corrosion of metal processing equipment and storage containers or any other metal parts that are in contact with the beverage.

Iron levels above 4 mg/L may require treatment of the wine to reduce the iron concentration in order to prevent unwanted cloudiness, oxidation and premature aging.

The present invention provides a novel means for selective removal of heavy metals, especially iron cations, from beverages such as wines and fruit juices. This invention overcomes the below-mentioned problems of known methods, for example it binds iron to the most complete extent possible, produces no toxicologically objectionable products even in the case of over clarification, and acts selectively on heavy metal ions.

PRIOR ART

Wines may be stabilized by removal of iron and copper with chelating agents, such as commercial resins, EDTA (ethylenediaminetetraacetic acid), pectinic acid, and alginic acid. Removal with ferrocyanide is probably the most efficient method because it precipitates most metal ions, including iron, copper, lead, zinc, and magnesium.

Cyanide treatment of the wine with potassium ferrocyanide (hexacyanoferrate(II)) is known as blue fining and is mainly used to remove iron by precipitation as sparingly soluble Prussian blue. Other heavy metal ions (Cu, Zn, Mg, Pb, Mn and Cd) are co-precipitated. Blue fining is currently the most internationally commonly used process for reducing the concentration of heavy metal ions, however, it is prohibited in many countries and is strictly controlled where permitted. Ferrocyanide use has some serious disadvantages in terms both of winery technology and, especially, of toxicology. The amount of potassium ferrocyanide required for clarification should be accurately determined by preliminary analytical tests. After blue fining, subsequent testing for cyanide is highly advisable, and in many countries mandatory, in order to detect residual levels. Residual ferrocyanide may result in the formation of toxic hydrocyanic acid. Furthermore, Prussian blue tends to form a colloidal solution in the wine so that, for example, subsequent fining with silica sol/gelatin is necessary. Colloidal Prussian blue slowly agglomerates and sediments, the consequence being long waiting times with the risk of gradual decomposition of the Prussian blue and the formation of hydrocyanic acid. Equipment that has come into contact with potassium ferrocyanide must be treated very thoroughly with sodium carbonate solution in order to destroy excess reagent or adherent Prussian blue. In addition, since Prussian blue contains cyanide it is classified as a special waste and its separated solids in the wines must be disposed of appropriately.

Cyanide compounds are highly toxic, causing harm by interfering with the body's use of oxygen. It stops the use of oxygen in metabolic pathways. It first affects the brain and central nervous system and eventually leads to suffocation and cardiac arrest. Cyanide compounds act very rapidly—usually within a few minutes—and may enter the body by inhalation of gas, skin absorption or ingestion. Symptoms of mild cyanide poisoning include headaches, giddiness, nausea, difficulty breathing, a feeling of general weakness with heaviness in arms and legs, and sometimes irritation of the nose, mouth and throat. Although the consumption of wine is unlikely to cause severe toxicity or death (the lethal dose in humans is approximately 50-60 mg), there may be some cases of mild cyanide poisoning; furthermore, chronic exposure to low levels of cyanide may induce some neurological disorders resembling Parkinson's disease.

Ferric casse may also be controlled by the addition of agents that limit the flocculation of insoluble ferric complexes. Gum arabic acts in this manner. It functions as a protective colloid, restricting haze formation. Because gum arabic limits the clarification of colloidal material, it can only be safely applied after the wine has undergone all other stabilization procedures. Furthermore, such stabilized iron (and excessive amounts of copper) still impart an undesirable metallic taste to the wine and also serve as oxidative catalysts that generate off-flavors during storage.

Finally, calcium phytate, $(Ca^{2+})_4$-phytate, has been employed to remove iron and copper from wine. However, this method is very ineffective due to the insolubility of calcium phytate. Therefore, the procedure relies on slow adsorption of iron and copper onto colloidal calcium phytate that needs to be kept dispersed by stirring the wine for several days.

The advantages of this novel method over other methods include its low cost, the safety of its industrial use, the absence of hazardous wastes during processing, the toxicological safety of the treated wine for human consumption, and the efficacy to remove iron from wine. It has no effect on pH, color, and taste with wines containing low to medium iron levels. In wines containing high iron levels taste is improved due to the removal of iron and due to the prevention of off-flavor generation. There is a protective effect on taste in wines containing high iron levels; this is especially true if phytic acid is added immediately after fermentation and the calcium carbonate shortly before bottling.

SUMMARY OF THE INVENTION

This invention is unique and unobvious to any enologist skilled in the art. The invention relies on several useful but independent chemical properties of phytic acid and its interactions with metals. Exploitation of these effects in the described method effects almost complete metal removal from wine and additional protection against oxidative catalytic activity of any residual iron. Furthermore, unlike blue fining and other chelation methods described elsewhere, the proposed sequential addition of phytic acid and calcium requires no knowledge of the exact concentration of iron and other metals and of the exact volume of wine inside the tank—the efficacy of the invention is premised on the excess of phytic acid relative to iron present in wine, and on the molar ratio of a calcium salt to phytate (5:1). This ratio assures complete precipitation of the mixed metal salt of phytic acid independent of the amount of iron, and it also prevents the accumulation of any added calcium.

Phytic acid is added in an amount that forms a soluble chelate with polyvalent cations present in wine, such as iron and calcium. It is added to wine preferably in a molar ratio of =1:1 (phytate:iron), which corresponds to 0.018 mM phytic acid or 11.8 mg/L or 0.0012% phytic acid or 0.0024% of 50% aqueous phytic acid for each 1 mg/L of iron present. Subsequently a calcium salt has to be added in a sufficient amount to co-precipitate the iron-phytate complex quantitatively, preferably in a molar ratio of 5:1 (calcium:phytate), which corresponds to 9.0 mg/l $CaCO_3$ or 0.0009% $CaCO_3$ (which provides a calcium concentration of 3.6 mg/L $Ca^{2+}$). The additions of phytic acid and calcium salt have to be made sequentially to allow for complete chelation of polyvalent cations by phytic acid before co-precipitation by calcium. A minimum of 330 mg of phytic acid and 250 mg of $CaCO_3$ per 1 liter of wine should be added to wines with iron concentrations of 25 mg/L or less (330 mg phytic acid is able to chelate 28 mg/L iron to form a 1:1 iron-phytate chelate, however, in effect may only chelate 25 mg/L of iron due to the presence of other polyvalent cations in the wine and analytical uncertainties). Wines with iron levels between 50 mg/L and 25 mg/L should be treated with 660 mg/L phytic acid and 500 mg/L $CaCO_3$. Wines with very high levels of iron, e.g. above 100 mg/L could be treated with even higher concentration of phytic acid and $CaCO_3$ or they could be treated twice with lower levels; however, the extremely high level of iron is likely to have caused substantial damage and the wine may be better suited for the production of distillation spirits. Wines with iron levels below 7-10 mg/L do not need to be treated as these levels are relatively stable (1). After treatment with phytic acid and calcium carbonate, the wine is then held for some time (from a few hours up to 7 days) to allow for completion of precipitation; it is then filtered and may be bottled. CaCO3 is used as the preferred calcium salt in order to counteract the acidifying effect of phytic acid. Depending on the desired sensory properties of the finished wine, however, any other calcium salt may be employed, such as calcium sulfate, at a preferred calcium concentration of 3.6 mg/L $Ca^{2+}$.

Phytic acid or myo-inositol hexaphosphoric acid is a strong chelating agent and antioxidant present in all seeds (Graf, E. Phytic Acid: Chemistry and Applications. Pilatus Press, Minneapolis, Minn., 1986). Phytic acid contains 12 dissociable protons and therefore it has a high chelation potential for polyvalent cations, whereas it does not bind sodium or potassium at all. The binding affinity increases exponentially with the valency of the cation, which means that phytic acid chelates low levels of iron even in the presence of high calcium concentrations. All metal 1-phytate complexes are very soluble at any pH, while metal-phytate complexes containing 3 or more cations are extremely insoluble. A few examples of such insoluble chelates include $(Ca^{2+})_3$-phytate, $(Ca^{2+})_4$-phytate, $(Ca^{2+})_5$-phytat $(Ca^{2+})_6$-phytate, $(Fe^{2+})_3$-phytate, $(Fe^{2+})_4$-phytate, $(Fe^{2+})_5$-phytate, $(Fe^{2+})_6$-phytate, $(Fe^{3+})_3$-phytate, $(Fe^{3+})_4$-phytate, $(Ca^{2+})_4(Fe^{3+})$-phytate, etc. Finally, phytic acid occupies all redox coordination sites on iron and thereby completely inactivates its catalytic activity, which accounts for the excellent antioxidant potential of phytic acid (Graf, E. and Eaton, J. W. Antioxidant Functions of Phytic Acid. Free Radical Biology and Medicine 8:61-69, 1990).

EXAMPLE 1

Blank: One liter of semisweet red wine with an iron content of 2.7 mg/L and a pH of 3.3 was stored at room temperature for a total of three days and then filtered through a 0.45 µm Millipore membrane; the residual iron content was determined by atomic absorption spectroscopy.

Treatment I: Triplicate samples of the above blank wine were spiked with 35 mg/l $Fe^{3+}$; the bottles were agitated at room temperature for three days, filtered through 0.45 µm membranes, and residual iron content was assayed by atomic absorption spectroscopy.

Treatment II: Triplicate samples of the above blank wine were treated with 35 mg/l $Fe^{3+}$ and 330 mg/L of 50% phytic acid; the bottles were stored for 1 day at room temperature and then the wine samples were treated with 125 mg/L $CaCO_3$, agitated for two days at room temperature, filtered and analyzed for iron as described above.

Treatment III: Triplicate samples of the above blank wine were treated with 35 mg/l $Fe^{3+}$ and 660 mg/L of 50% phytic acid; the bottles were stored for 1 day at room temperature and then the wine samples were treated with 250 mg/L $CaCO_3$, agitated for two days at room temperature, filtered and analyzed for iron as described above.

|  | Fe [mg/L] | pH |
|---|---|---|
| Blank wine (no added iron) | 2.7 | 3.3 |
| Treatment I (iron added) | 37.0 | 3.2 |
| Treatment II (iron plus full-strength phytic acid and calcium added) | 2.5 | 3.3 |
| Treatment III (iron plus half-strength phytic acid and calcium added | 0.8 | 3.3 |

What is claimed is:

1. A method for selective removal of heavy metals from beverages said method comprising:
   adding phytic acid to the beverage in an amount sufficient to chelate the polyvalent cations present in the beverage;
   storing the treated beverage for a period of time sufficient to chelate the polyvalent cations;
   treating the beverage with a calcium salt in an amount sufficient to co-precipitate the metal-phytate complexes;
   storing the treated beverage for a period of time sufficient for metal precipitation; and
   removing the insoluble metal sludge through separation.

2. The method of claim 1 wherein the beverage is wine.

3. The method of claim 1 wherein said polyvalent cations comprise at least one polyvalent cation selected from the group consisting of iron and calcium.

4. The method of claim 3 wherein the phytic acid is added to the beverage in a molar ratio of about 1:1 (phytate:iron), which corresponds to 0.018 mM phytic acid for each 1 mg/L of iron present.

5. The method of claim 1 wherein the calcium salt is added in a sufficient amount to precipitate the phytate complex quantitatively.

6. The method of claim 5 wherein the calcium salt is added in a molar ratio of about 5:1 (calcium:phytate).

7. The method of claim 5 wherein the calcium salt is calcium carbonate or calcium sulfate.

8. The method of claim 1, wherein the separation comprises microfiltration.

* * * * *